Nov. 14, 1967
O. BELLAR
3,353,133
VARIABLE ELECTRICAL RESISTANCE DEVICE
Filed Nov. 2, 1966
2 Sheets-Sheet 1
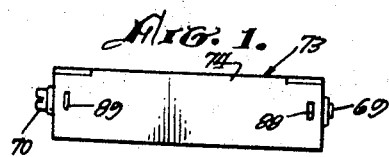
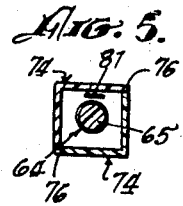
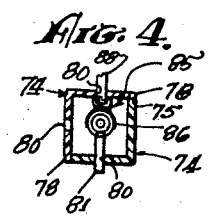
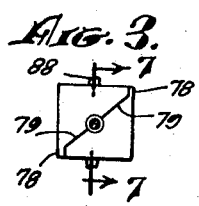
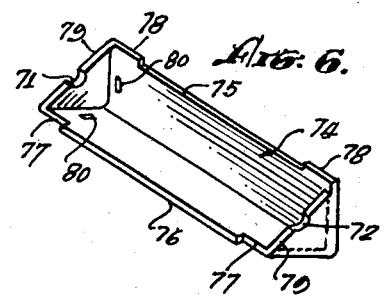
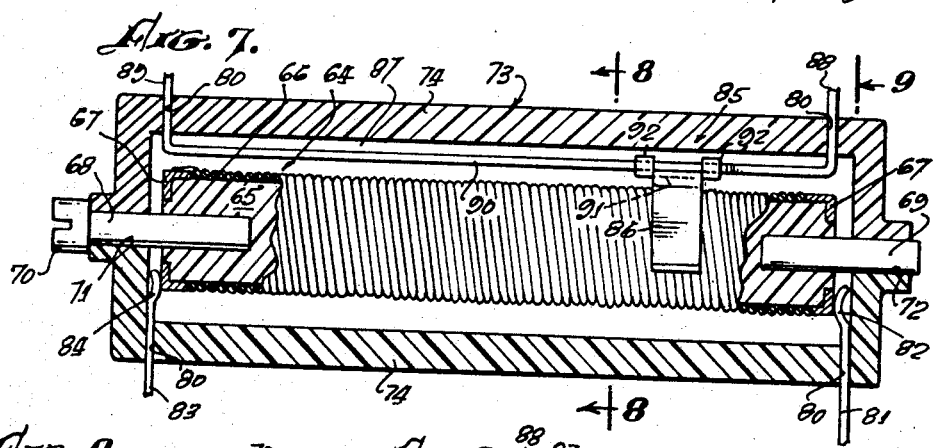
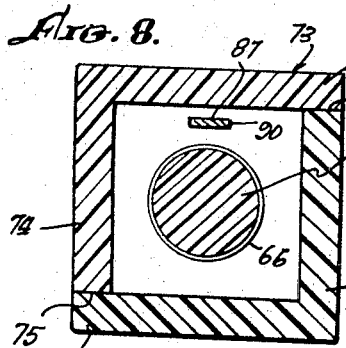
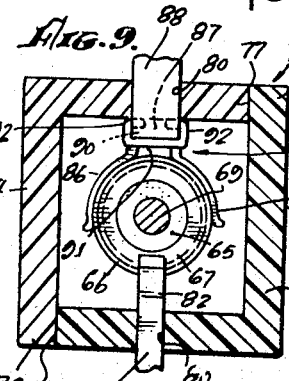
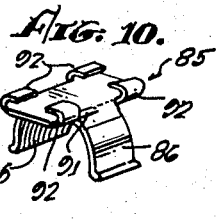
INVENTOR
OSCAR BELLAR,
By Harold J. LeVercomte
ATTORNEY.

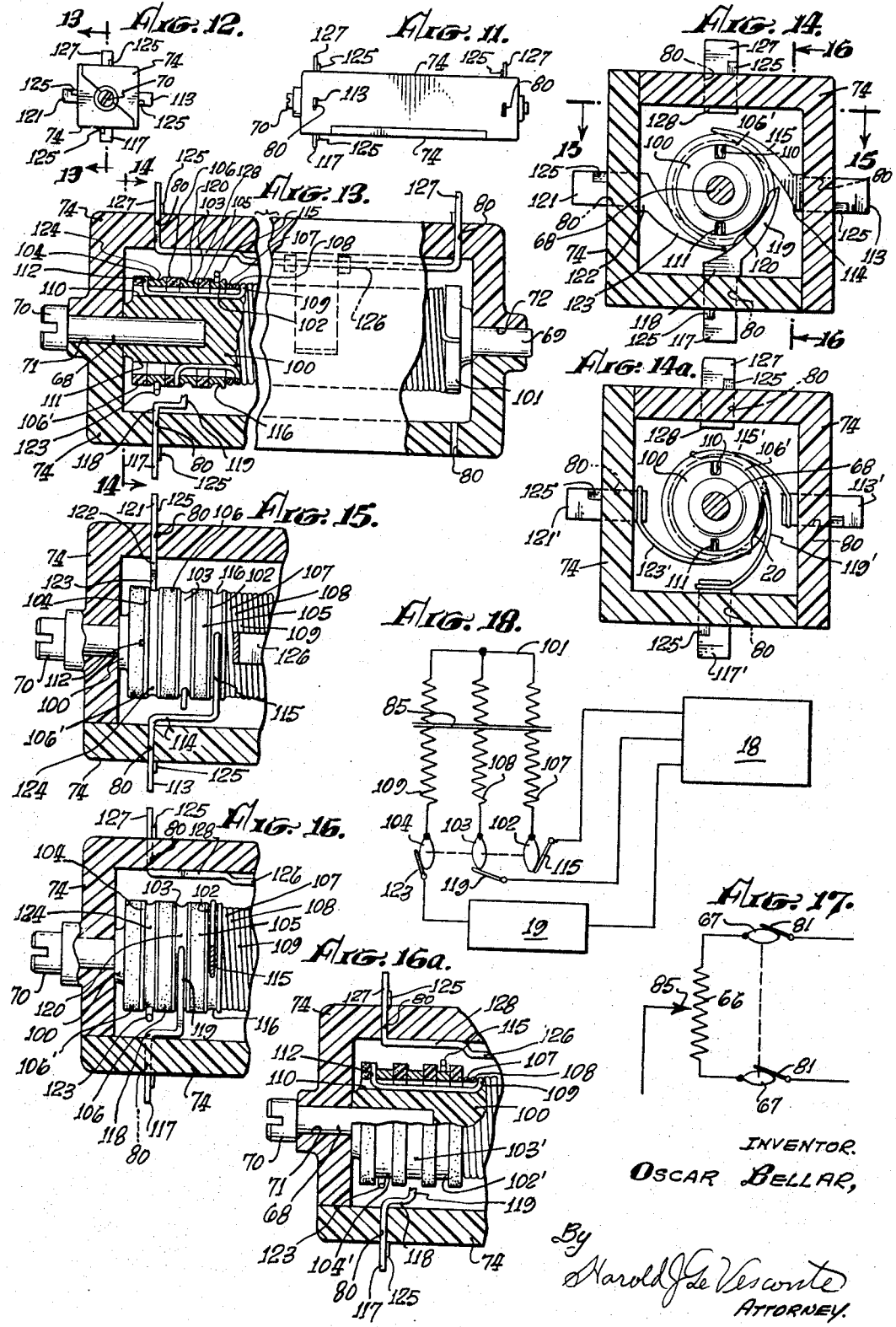

United States Patent Office 3,353,133
Patented Nov. 14, 1967

3,353,133
VARIABLE ELECTRICAL RESISTANCE DEVICE
Oscar Bellar, Alhambra, Calif., assignor of thirty-five percent to Terence Dalby, Alhambra, Calif.
Filed Nov. 2, 1966, Ser. No. 591,530
8 Claims. (Cl. 338—145)

ABSTRACT OF THE DISCLOSURE

A variable resistance device comprising a rotatable core carrying a winding and enclosed in a housing affording bearings for the rotatable core. Brush and slip ring means carried by the housing and core, respectively, afford electrical connection with the winding and the helical convolutions of the winding engage another brush mounted within the housing for movement parallel to the axis of the core whereby rotation of the core causes said last named brush to move along the winding. The movable brush may be either electrically connected in a circuit by a terminal on the exterior of the housing or serve simply as a shorting means between convolutions of the winding.

Summary

This invention is directed to an electrical resistance means in which a relatively few parts can be variously assembled into a wide variety of resistance devices. Fundamentally, the device comprises a two-part housing and a rotatable cylindrical core carrying a desired helical winding thereon and having journals at each end thereof which are mounted for rotation in bearings in the end walls of the housing as an incident to the assembly of the housing parts to form the housing. The housing components are provided with a plurality of terminal openings for selective installation of various types of brush elements, and rotatable cores may be provided having different types of slip ring and winding arrangements whereby the cores may be selectively installed in the housings which are identical except for the installation therein of suitable brush means for the particular core assembly being employed.

This invention is a continuation-in-part of my co-pending application Ser. No. 504,901 filed Oct. 24, 1965, and relates to that form of variable electrical resistance devices originally shown in said co-pending application in which a helically wound resistance component is caused to rotate relative to a brush element which is moved parallel to the axis of rotation of the resistance component by reason of its engagement with the helical convolutions of the resistance component.

The principal objects of the invention are: to provide a variable resistance device of the above character in which the rotatable resistance component and the brush element associated therewith are fully enclosed within a housing, to provide a housing for a resistance device of the above character which is formed from identical interlocking parts, and in which said parts of said housing additionally, form bearing support for the resistance component and mounting means for the terminal members of the device.

With the foregoing objects in view, together with such additional objects and advantages as may subsequently appear, the invention resides in the parts, and in the construction, combination and arrangement of parts described, by way of example, in the following specification of certain presently prefered embodiments of the invention, reference being had to the accompanying drawings which form a part of said specification.

FIGS. 1 through 10b relate primarily to the first embodiment of the invention and in these figures:
FIG. 1 is a top plan view,
FIG. 2 is a side elevational view,
FIG. 3 is an end elevational view of the left hand end of FIG. 2,
FIGS. 4 and 5 are transverse sectional views taken respectively on the lines 4—4 and 5—5 of FIG. 2,
FIG. 6 is a perspective view of one of the identical halves forming the casing or housing of the device,
FIG. 7 is a greatly enlarged, medial sectional view taken on the line 7—7 of FIG. 3, certain portions of the device being broken away to disclose structure otherwise concealed,
FIGS. 8 and 9 are transverse sectional views taken respectively in the planes represented by the lines 8—8 and 9—9 of FIG. 7,
FIG. 10 is a perspective view of the brush or contact element of the device,
FIG. 10a is an alternate form of brush component, and
FIG. 10b is a longitudinal sectional view taken on the line 10b—10b of FIG. 10a.
FIGS. 11 through 16 illustrate a second embodiment of the device and in which:
FIG. 11 is a side elevational view of the second embodiment of the device,
FIG. 12 is an end elevational view of the left hand end of FIG. 11,
FIG. 13 is a greatly enlarged, medial longitudinal sectional view taken on the line 13—13 of FIG. 12,
FIG. 14 is a transverse sectional view taken on the line 14—14 of FIG. 13,
FIG. 14a is a view similar to FIG. 14 but showing an alternative form of brush means,
FIGS. 15 and 16 are fragmentary sectional views taken, respectively, on the lines 15—15 and 16—16 of FIG. 14, and
FIG. 16a is a view similar to FIG. 16 but showing a second form of brush retaining means.
FIG. 17 is a circuit diagram of the first form of the invention, and
FIG. 18 is a circuit diagram of the second embodiment of the invention.

Referring first to FIGS. 1–10 and 17, there is shown an embodiment of the invention in which the resistance means is rotatably mounted and in which a cooperating brush element is mounted for sliding movement parallel to the axial line of the resistance component and is moved along the resistance component by engagement with the helical grooves formed by the windings on the resistance component. The resistance component assembly comprises an elongated cylindrical body 65 of non-conductive material on which a conductor 66 is closely helically wound. At each end thereof, the member 65 carries one each of a pair of metal slip rings 67, 67 to which the opposite ends of the winding 66 are electrically conductively connected. The cylindrical body 65 at each end thereof is provided with one each of a pair of bearing studs 68 and 69 disposed in the axial line of the body, the stud 68 terminating in a slotted head 70. While not here shown, it is believed to be obvious that this bearing means may be formed integrally as a part of the cylindrical body if desired.

The bearing studs 68 and 69 are journaled in bearings 71 and 72 formed in the housing 73, said housing being formed of a pair of identical members 74, one of which is shown in FIG. 6, and comprising an elongated right angle member forming the two adjacent sides of the hollow rectangle with the edges thereof provided with a center notch 75 adapted to be engaged by the complementary tongue 76 of the opposite member and with end notches 77, 77 engageable by the complementary tongue portions 78, 78 of the other half of the case and said members having end webs defined by diagonal faces 79, 79 which are recessed to form respective halves of the bearings 71 and 72. Adjacent the end walls or webs 79, the side walls of the case are provided with narrow slits 80 for the entrance of terminal means for electrical connection. Preferably, the body forming members are formed from plastic non-conductive material and the meeting edges thereof are adhered together to form a tight dust and moisture proof enclosure for the elements contained within the housing.

A representative connection for the resistance assembly is shown in FIG. 7 in which a terminal member 81 extends through one of the slots 80 from the exterior of the housing and terminates inside the housing in a bowed spring portion 82 which engages one of the slip ring members 67 while a corresponding terminal 83 extends through another of the slits 80 at the opposite end of the housing and terminates in a bowed spring portion 84 engaging the other of the slip rings 67. Thus, assuming that only a single conductor 66 is wound on the member 65 and that the terminals 81 and 83 are connected in an electrical circuit, the winding 66 will constitute a resistance winding in series with that particular circuit.

Also shown in FIG. 7 is a brush component 85 formed of a single piece of resilient sheet metal and including oppositely curved contact members 86, 86 yieldingly engaging the surface of the winding 66 at opposite sides thereof and with at least one of said leaf members being provided with suitable grooves and ridges which are complementary to the helical groove formed by the winding 66. The winding 66 is formed of wire having an insulating coating so that adjacent convolutions are insulated from each other and the outer peripheral surface has the insulating coating removed therefrom to afford electrical contact with the brush component above described.

The brush component is slidably mounted on a bus bar 87 formed as a part of a terminal end 88 extending through one of the slits 80 and a second terminal end 89 extending through the corresponding slit at the opposite end of the housing, said bus bar including a relatively heavy body portion 90 and the brush component 85 having a face 91 engaging the side of the bus bar portion which is adjacent to the winding 66 and further having rebent lip elements 92, 92 which engage the opposite edges of the portion 90 at each side of the face 91 so as to maintain the brush component in sliding, electrically conductive contact with the bus bar.

Assuming that the terminals 81 and 83 are connected in an electrical circuit and that the terminal 88 is connected to another portion of the circuit, it will be obvious that as the resistance assembly is rotated in a direction to move the brush component to various positions along the resistance assembly, the current delivered to the terminal 88 will be varied according to the position of the brush component axially of the resistance assembly. In other words, as thus connected in an electrical circuit, the device serves as a potentiometer. Assuming further, that one of the terminals 81 or 83 together with the terminal 88 is connected in a circuit, the device serves as a simple rheostat. Also, while not shown in the drawings, it will be obvious that the bus bar portion 90 may have a winding imposed thereon on which the brush component moves and with which it has electrically conductive contact so that the variation in resistance of the winding 66 is further modified by a winding on the bus bar portion of the device.

FIGS. 10a and 10b illustrate an alternative form of brush component comprising a sheet metal base portion 85' generally similar to the center portion of the brush component 85 and having bus bar engaging lip elements 92' formed integrally therewith. The contact members 86, 86 are replaced by a plurality of spring wires 86' bent into the same configuration as the members 86, said wires at their midlength being soldered to the base portion 85'. Where very minute current is concerned, these individually resilient wires will further insure the making of a good contact.

Because of the fact that there are four terminal receiving slits at each end of the case or housing, it becomes possible for the device to be made with three separate slip rings at one end only of the cylindrical body 65 and that three separate spring contact members be arranged at that end of the body to be mounted in one each of three of the terminal receiving slits and to engage one each of the slip rings with the slip rings, in turn, connected to one each of three conductors wound on the body 66. This variation is illustrated in FIGS. 11 through 16 in which all parts which are identical with those above described have been given the same numbers and need not be further described.

In this embodiment of the invention, the cylindrical body 100 is mounted as before on the bearing studs 68 and 69 within a housing formed of a pair of the housing forming members 74. The cylindrical body 100 has a terminal ring 101 fixed to one end thereof and carries three slip rings 102, 103 and 104 fixed to the opposite end thereof in side-by-side relation with an insulating ring 105 interposed between the slip rings 102 and 103, with another insulating ring 106 interposed between the slip rings 103 and 104 and an outer insulating ring 106' engaging the outer end face of the slip ring 104. A resistance assembly comprising three wire conductors 107, 108 and 109 disposed side by side is wound about the body 100 and each of said conductor members may have one end thereof electrically conductively connected to the terminal ring 101. The opposite end of the conductor 107 is conductively connected to the adjacent side of the slip ring 102. A groove 110 formed in the body 100 carries the corresponding opposite end of the conductor 108 from the convolution thereof which is adjacent to the slip ring 102 under the slip rings 102 and 103 and the interposed insulating ring 105 and said opposite end is conductively connected to the side of the slip ring 103 which is adjacent to the insulating ring 106, the side face of the ring 106 in contact with the slip ring 103 being recessed to afford clearance for the end of the conductor. The corresponding opposite end of the conductor 109 correspondingly extends from the convolution thereof adjacent the slip ring 102 along a groove 111 formed in the cylindrical body 100 beneath all of the slip rings and the insulating rings 105 and 106 and has the end thereof conductively connected to the side of the slip ring 104 which is adjacent to the insulating ring 106', said insulating ring having a recess 112 formed in the side face thereof affording clearance for the end of the conductor. Thus, while the three conductors may be electrically interconnected by the ring 101 at one end, their opposite ends are separately conductively connected to one each of the three slip rings.

The housing 73 at each end thereof has slits 80 extending therethrough for the reception of terminal means. At the end of the housing adjacent the slip rings 102, 103 and 104, one of the slits carries the shank 113 of a flat metal terminal member 114 which, within the housing, is laterally offset and terminates in a resilient contact arm portion 115 engaging a groove 116 in the outer face of the slip ring 102. A second one of said slits 80 carries the shank 117 of a similar terminal member 118 which within the housing, terminates in an offset portion having a resilient contact arm portion 119 which engages a groove 120 in the outer surface of the slip ring 103. A third one of the slits 80 carries the similar shank 121 of a terminal member 122 which, within the housing, terminates in a resilient contact arm portion 123 engaging a groove 124 in the outer surface of the slip ring 104. These terminal members, adjacent the inner face of the housing, are slightly wider than the slits 80 through which the shanks extend and the shanks, exteriorly of the housing, are transversely slitted to permit a portion of the shank to be bent laterally out of the plane of the shank to lock the terminal in its respective slit as shown at 125.

The brush component 85 is the same as employed in the first embodiment and is mounted for movement on a guide bar 126 which is like the bus bar 90 of the first embodiment but which is not connected to any part of the circuit, the brush component 85 serving only as a shorting bar between the three conductors at its point of contact therewith as appears from the circuit diagram of FIG. 18. The guide bar 126 has end portions 127, 127 which project through slits 80 at opposite ends of the housing and the portion of the guide bar which is directly opposite the slip rings is offset against the housing wall as at 128 to afford clearance for the slip rings and the contact arms associated therewith and to allow the resulting offset portion 128 to serve as a stop to limit the extent of movement of the brush component to the extent of the porion of the body 100 which is covered by the resistance conductors.

As the cylindrical body is rotated by the slotted head 70 associated therewith, the brush element will be moved axially along the conductors and will interconnect the adjacent convolutions thereof with appropriate changes in the resistance afforded thereby. When all three terminals are appropriately connected in an electrical circuit, the device will operate as a potentiometer. When any two of the terminals are appropriately connected in the circuit, the device will operate as a simple variable resistance or rheostat.

It is particularly to be observed that both illustrated embodiments of the invention employ identical principal parts. The cylindrical members 65 and 100 can be formed from plastic rod with slightly different machining at the ends thereof. The housing elements are identical and, accordingly, important manufacturing economies are achievable because of these factors. To achieve complete enclosure of the contact apparatus, those ones of the slits 80 which are not used in any particular assembly of the device can be easily closed with appropriate adhesive material. Moreover, it is believed to be completely obvious that the grooved slip rings can be disposed at either end of the housing and that a pair of such rings may be substituted for the slip rings 67, 67 shown in the first embodiment of the invention with appropriate substitution of terminal and contact arm elements to achieve still further simplification.

FIG. 14a shows a modification in the construction of the slip ring contacting brushes in which the brush elements 114, 118 and 122 are modified as at 114′, 118′ and 119′ by the substitution of spring wire contact portions 115′, 119′ and 123′ for the integrally formed contact portions 115, 119 and 123, said wire contact portions having one end thereof soldered or welded to the shanks 113′, 117′ and 121′.

FIG. 16a shows a modification in the means for retaining the brush elements against lateral movement with possible shorting as an alternative to the grooves in the slip rings. In this modification, the slip rings 102′, 103′ and 104′ are formed with flat outer surfaces and the guidance for retaining the respective brushes is achieved by forming the 105, 106, and 106′ of slightly larger diameter than the slip rings forming guiding channels for the brushes engaging the rings 103′ and 104′ and by interposing a similar insulating ring 105′ at the side of the slip ring 102′ adjacent the winding to cooperate with the ring 105 in forming a guidance groove for the brush contact 115.

In view of the fact that in the foregoing specification, certain presently preferred embodiments of the invention have been disclosed and certain modifications thereof have been mentioned, it will be obvious that the invention is not to be deemed to be limited to the precise details of construction thus disclosed by way of example, wherefore, it will be understood that the invention includes as well all such changes and modifications in the parts and in the construction, combination and arrangement of parts as shall come within the purview of the appended claims.

I claim:

1. In a variable electrical resistance device, a housing having a side wall and opposed end web portions and a resistance component mounted for rotation within said housing component; said resistance component comprising a cylindrical body having axially aligned bearing journals at the opposite ends thereof rotatably mounted in bearings formed in said housing end web portions, resistance means on said cylindrical body comprising at least one length of wire closely wound thereon the adjacent convolutions of said wire being insulated from one another and the outer surface of said length of wire being uninsulated and the adjacent convolutions of said wire forming a helical groove on the exterior of said resistant component, means for electrically connecting said resistance means in an electrical circuit comprising at least one slip ring fixed to one end of said cylindrical body in coaxial relation thereto and electrically conductively connected to one end of said wire, and a stationary brush element carried by said housing including a contact portion maintained in yielding contact with said slip ring and another portion extending through a wall of said housing for connection in an electrical circuit, a movable brush component means carried by said housing and including means effecting both electrical conductive connection with said uninsulated surface of said resistance wire and mechanical engagement with said helical groove, a bus bar within said housing disposed parallel to and substantially longitudinally coextensive with said resistance component on which said brush component is slidable, and means on the exterior of said housing for effecting rotation of said resistance component with resultant movement of said brush component along said bus bar by reason of said mechanical engagement of said brush component with said helical groove, said housing completely enclosing said resistance component and being formed of interfitting parts each including a portion of both end web portions so shaped as to combine to form said bearings for said journals whereby assembly of said housing simultaneously encloses said resistance component and the contact portions of said brushes and mounts said resistance component for rotation within said housing on said bearings and said bus bar and said brush component being wholly mounted on one of said housing parts.

2. A variable electrical resistance device as claimed in claim 1 in which said housing is formed of a pair of identical parts each defining half of the side wall portion of said housing and half of each end web portion of said housing and said parts having meeting faces disposed in a plane containing the axial line of rotation of said resistance component including complementary semicircular, concave surfaces combining to form said bearings for said cylindrical body.

3. A variable electrical resistance device as claimed in claim 1 in which said resistance component includes a pair of slip rings disposed one each at each end of said resistance component and in which each end of said housing is provided with a plurality of openings in which one each of two brush elements having yielding electrically conductive contact, one each with each of said slip rings may be optionally mounted, each of said brush elements including a terminal extending through the opening in which it is secured to the exterior of said housing component affording connection in an electrical circuit.

4. A variable electrical resistance device as claimed in claim 1 in which said resistance winding comprises a plurality of wires disposed in side-by-side relation and helically wound as a unit on said cylindrical body, in which said body carries a plurality of slip rings to one each of which one each of said wires is connected, in which said housing carries a plurality of terminals electrically conductively connected one each by separate resilient brush means to one each of said slip rings, and in which said brush component on said bus bar serves as a shorting element for interconnecting said adjacent wires at infinitely variable adjacent points in the lengths of said adjacent wires.

5. A variable electrical resistance device as claimed in claim 1 in which said bus bar is electrically conductive and has electrically conductive engagement with said brush component supported thereon and in which said bus bar is electrically conductively connected to terminal means on the exterior of said housing affording connection in an electrical circuit.

6. A variable electrical resistance device as claimed in claim 2 in which the meeting edges of said two parts of said housing include means for locating them in predetermined registry with one another.

7. A variable electrical resistance device as claimed in claim 4 in which said plurality of slip rings are disposed at one end of said cylindrical body and are insulated from each other, and in which said plurality of brush means engaging said slip rings extends through the wall of said housing component at different sides thereof.

8. A variable electrical resistance device as claimed in claim 7 in which means is provided for preventing each of said slip ring engaging brush means from lateral movement out of contact with the slip ring with which it is associated.

References Cited

UNITED STATES PATENTS

| | | | |
|---|---|---|---|
| 2,204,623 | 6/1940 | Ruben | 338—16 |
| 2,442,469 | 6/1948 | Palya | 338—126 |
| 2,938,186 | 5/1960 | Kassay et al. | 338—180 |
| 3,069,647 | 12/1962 | O'Brian | 338—180 |
| 3,188,590 | 6/1965 | Earley | 338—145 X |
| 3,284,752 | 11/1966 | Bellar | 338—143 X |

RICHARD M. WOOD, *Primary Examiner.*

J. G. SMITH, *Assistant Examiner.*